(12) United States Patent
Perez et al.

(10) Patent No.: US 9,690,678 B2
(45) Date of Patent: Jun. 27, 2017

(54) FAULT TOLERANT SYSTEMS AND METHOD OF USING THE SAME

(71) Applicant: Siemens Energy, Inc., Orlando, FL (US)

(72) Inventors: Rafael Perez, Alpharetta, GA (US); James Michael Weiss, Roswell, GA (US); Peter Nicholas Francino, Renfrew, PA (US)

(73) Assignee: SIEMENS ENERGY, INC., Orlando, FL (US)

( * ) Notice: Subject to any disclaimer, the term of this patent is extended or adjusted under 35 U.S.C. 154(b) by 122 days.

(21) Appl. No.: 14/660,182

(22) Filed: Mar. 17, 2015

(65) Prior Publication Data
US 2015/0269038 A1  Sep. 24, 2015

Related U.S. Application Data

(60) Provisional application No. 61/955,434, filed on Mar. 19, 2014.

(51) Int. Cl.
*G06F 11/20* (2006.01)

(52) U.S. Cl.
CPC ...... *G06F 11/2028* (2013.01); *G06F 11/2033* (2013.01); *G06F 11/2041* (2013.01); *G06F 2201/805* (2013.01)

(58) Field of Classification Search
USPC .......................................................... 714/13
See application file for complete search history.

(56) References Cited

U.S. PATENT DOCUMENTS

| | | | | |
|---|---|---|---|---|
| 5,834,856 A | * | 11/1998 | Tavallaei | G06F 1/20 307/131 |
| 5,835,697 A | * | 11/1998 | Watabe | G06F 11/1658 714/11 |
| 6,002,970 A | * | 12/1999 | Abdelnour | G05B 9/03 700/82 |
| 6,601,101 B1 | * | 7/2003 | Lee | H04L 67/1008 709/202 |
| 6,754,846 B2 | * | 6/2004 | Rasmussen | G05B 9/03 714/11 |
| 7,047,440 B1 | * | 5/2006 | Freydel | G05B 19/0428 714/10 |
| 7,877,627 B1 | * | 1/2011 | Freydel | G06F 11/1633 714/11 |
| 7,908,520 B2 | * | 3/2011 | Avizienis | G06F 11/2028 714/30 |
| 2002/0116683 A1 | * | 8/2002 | Mitra | G06F 11/184 714/797 |

* cited by examiner

*Primary Examiner* — Kamini Patel

(57) ABSTRACT

Systems and methods for resolving fault detection in a control system is provided. The system includes an I/O module operably connected to a first, second, and third microcontroller for transmitting data. The first microcontroller is in an active state, i.e., in control, while the remaining controllers are in an idle state. The system further includes an event generator for generating an event indicative of a fault occurrence, and a means for detecting a fault event. The system also includes a means for reassigning a controller, wherein upon detection of a fault event in both the first and second controllers, the means for reassigning a controller changes the state of the third controller to active, leaving the remaining controllers idle or in a shutdown state, thereby effectively assigning control from the first controller to the third controller.

21 Claims, 3 Drawing Sheets

FAULT TOLERANT SYSTEMS AND METHOD OF USING THE SAME

CROSS REFERENCE TO RELATED APPLICATIONS

This non-provisional application claims the benefit of and priority from U.S. Provisional Patent Application Ser. No. 61/955,434 filed Mar. 19, 2014, which is incorporated by reference herein in its entirety.

TECHNICAL FIELD

The present disclosure relates generally to control and computing systems, and more particularly, to control and computing redundant systems and methods of using the same.

BACKGROUND

Redundant configurations of computing and control systems have been used to provide system fault tolerance, which is the ability of a system to continue to perform its task after the occurrence of faults. A system failure that occurs as a result of a system component fault can be either a safe failure or dangerous failure. A safe failure occurs, for example, when an emergency shutdown system fails such that it causes a shutdown not associated with the controlled process. A dangerous failure is a failure that prevents the system from responding to hazardous situations, thus preventing the emergency shutdown system from performing a required shutdown. Typical fault systems are based on dual modular redundancy (DMR) or triple modular redundancy (TMR) architectures to achieve fault tolerance and increase safety and reliability. DMR are characterized by a master and hot standby configuration, which allows for the repair or replacement of one half of the redundant pair without service interruption when a single fault is experienced. However, issues arrive in the DMR architecture in instances where a fault occurs in both the master and hot standby, which may lead to a complete system failure. TMR architecture employs three or more devices, each performing the same function, and using a majority voting process to compare the results of each device to detect failures. If no failures have occurred, the output of the three devices is identical. However, if one or more faults occur, the output of the three devices may be different, and the majority voting system is used to decide which of the devices' outputs is correct. If two of the three outputs are the same, then the system will output the results of the two devices, thereby masking the fault of the device with a different output. However, issues arise with the voters in the TMR system. For example, should one of the voters of the majority voting system fail, there can be no majority vote by the remaining two voters. This is problematic when the remaining two voters have a different output. Therefore, there remains a need for systems and methods that provide reliability in instances where both the master and hot standby devices of a DMR system fails, and which eliminates the need to employ a voting system.

SUMMARY

An object of the present disclosure is to provide an improved redundant computer system that may be able to tolerate multiple faults, and more particularly, the failure of both the main primary controller and hot standby controller.

In one embodiment, a redundant control system is provided. The control system may be a nonvoting redundant system (NVR). The NVR may include an I/O module operably connected to a first, second, and third microcontroller for transmitting data. The first microcontroller is in an active state and controls output, while the second and third microcontrollers are idle. Each microcontroller generally includes: an I/O circuit operably connected to the I/O module for transmitting data between each controller and the I/O module, a memory for storing data from the I/O module and one or more executable instructions. Each microcontroller further includes a processing circuit operably connected to one of the memory and I/O circuits for processing the data, and executing the one or more executable instructions. Additionally, the first and second microcontrollers includes: an event generator for generating an event indicative of a fault occurrence. The first, second, and third microcontrollers may include: a means for detecting an event operably connected to the event generator for detecting a generated fault event, and for communicating the fault event to a means for reassigning a controller. The third microcontroller may include: the means for reassigning a controller operably connected to one of the event generators and means for detecting an event. The means for reassigning a controller may be operable to change the state of each microcontroller. Additionally, upon detection of the fault event in both the first and second controllers, the means for reassigning a controller switches the state of the third controller to active, resulting in the third controller being in control, and the state of the first controller to idle, or a shutdown state such that the first controller can be repaired and/or replaced. Additionally, the second controller may be shutdown such that it too can be repaired or replaced.

In another embodiment, a method for resolving fault detection in a control system is provided. The method generally includes the step of monitoring, via a means for detecting an event indicative of a fault occurrence, an operation of a first controller in an active state, i.e., in control, and a second controller in a idle state. The method may further include the step of detecting an event indicative of a fault occurrence in the first controller, and detecting an event indicative of a fault occurrence in the second controller. Additionally, the method includes the step of: activating, via a means for reassigning a controller, a third controller in response to both fault events, resulting in the third controller being in an active state and taking control from the first controller, which may be switched to a shutdown state for removal, repair or replacement.

In yet a further embodiment, a non-transitory computer-readable medium storing therein programming logic(s) that causes a third controller in an idle state to execute an operation. In this embodiment, the operation may include: monitoring, via a means for detecting an event indicative of a fault occurrence, an operation of a first controller in an active state and a second controller in a idle state. The operation may further include detecting an event indicative of a fault occurrence in the first controller, and detecting an event indicative of a fault occurrence in the second controller. The operation may additionally include: activating, via a means for reassigning a controller, the third controller in response to both events by switching the third controller to an active state, thereby giving the third controller control, which was previously given to the first controller, and switching the first controller to a state where it is no longer in control, and allows for removal or repair of the faulty controller(s).

DETAILED DESCRIPTION

The components and materials described hereinafter as making up the various embodiments are intended to be illustrative and not restrictive. Many suitable components and materials that would perform the same or a similar function as the materials described herein are intended to be embraced within the scope of embodiments of the present invention.

In general, the computing systems and devices described herein may be assembled by a number of computing components and circuitry such as, for example, one or more processors (e.g., Intel®, AMD®, Samsung®) in communication with memory or other storage medium. The memory may be Random Access Memory (RAM), flashable or non-flashable Read Only Memory (ROM), hard disk drives, flash drives, or any other types of memory known to persons of ordinary skill in the art and having storing capabilities. The computing systems and devices may also utilize cloud computing technologies to facilitate several functions, e.g., storage capabilities, executing program instruction, etc. The computing systems and devices may further include one or more communication components such as, for example, one or more network interface cards (NIC) or circuitry having analogous functionality, one or more one way or multi-directional ports (e.g., bi-directional auxiliary port, universal serial bus (USB) port, etc.), in addition to other hardware and software necessary to implement wired communication with other devices. The communication components may further include wireless transmitters, a receiver (or an integrated transceiver) that may be coupled to broadcasting hardware of the sorts to implement wireless communication within the system, for example, an infrared transceiver, Bluetooth transceiver, or any other wireless communication know to persons of ordinary skill in the art and useful for facilitating the transfer of information.

Figure 1:
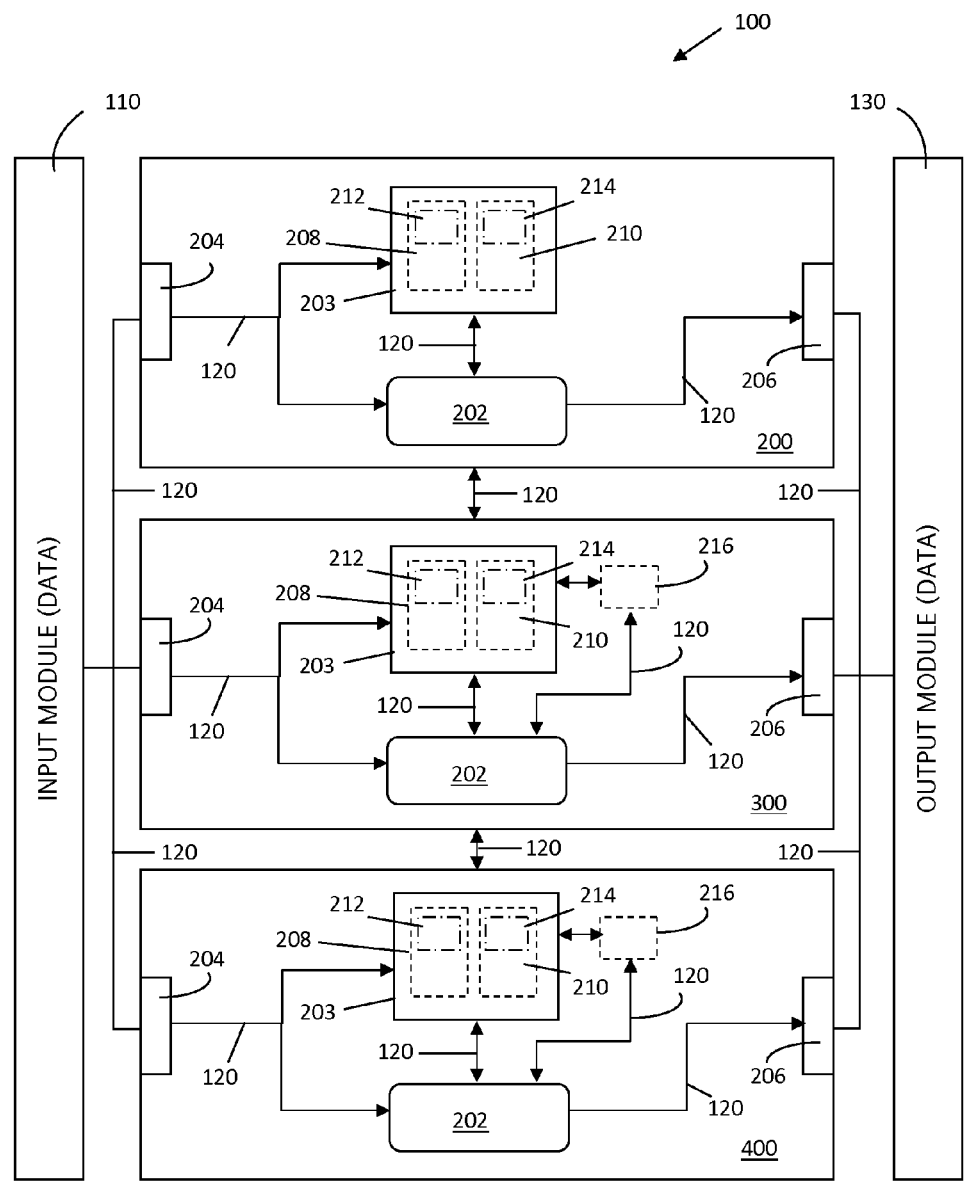
FIG. 1 illustrates a block diagram of an embodiment of a redundant system in accordance with the disclosure provided herein.

Referring now to the drawings wherein the showings are for purposes of illustrating embodiments of the subject matter herein only and not for limiting the same, FIG. 1 illustrates an embodiment of a redundancy system 100. The redundancy system may be a non-voting redundancy system (NVR) 100, and may generally include a plurality of controllers/microcontrollers operably connected to one another for providing redundancy in instances where a fault occurs. As described in the exemplary embodiments herein, the term controllers and microcontrollers are interchangeable, and may generally include similar hardware/software configurations. In the exemplary embodiment of FIG. 1, the NVR 100 may include a first primary controller 200, a second hot-standby controller 300, and a third smart reserve (SR) controller 400. The primary 200, hot-standby 300, and SR 400 controllers may include similar hardware and software configurations such that in the event a fault occurs in one or more of the controllers, any of remaining controllers is operable to function in the role of the faulty controller(s).

The primary 200, secondary 300, and SR 400 controllers may operate in parallel to one another, such that, should one or more of the controllers fail, the remaining controller may assume the responsibilities of the faulty controllers. In parallel typically means that information distributed to and disseminating from the one or more controllers may be similar, identical, or adequate such that the remaining controller can operably function in place of the faulty controller. The NVR 100 may further include an input module 110 operably connected to each of the controllers via one or more common buses 120 for transmitting data/information to the controllers of the NVR 100. The transmission of information may be one-directional or multidirectional, e.g., bi-directional, between the one or more controllers of the NVR 100. The NVR 100 may also include an output module 130 operably connected to each of the controllers via the bus 120 for receiving output data from the active controller. Additional input/output I/O modules may also be included into the NVR 100 to expand the NVR 100. It should further be appreciated that communication between the controllers and/or devices of the NVR 100 may also be by a wireless communication means utilizing wireless transmitters, local area networks, global area networks or any means known to persons of ordinary skill in the art for facilitating the communication between controllers or devices.

In general, each of the controllers contains processing circuits for performing various processing operations typical of a controller and/or processor. Each of the controllers may also contain circuitry for detecting various types of malfunctions that may occur within the controller, or within the other (neighboring) controllers operably connected thereto. In an exemplary embodiment, each of the primary controller 200, secondary controller 300, and SR controller 400 may include an input circuit 204 operably connected to the input module 110 for receiving input data, and storing the same in a memory 203. Each controller may further include a processing circuit 202 operably connected to the memory 203 for processing a series of executable instructions stored in the processing circuit 202 or memory 203, for facilitating the transmission of data throughout the controller. Each controller may further include an output circuit 206 operably coupled to the processing circuit 202 and output module 130 for outputting the processed data.

With continued reference to the figures, each controller may further include one or more programmable logics, e.g., a means for detecting an event (checker/polling logic 208), or fault logic 210. The logics may be its own independent circuitry within the controller and operably connected to one or more of the memories 203 and processing circuits 202 of the controllers in the NVR 100. In the embodiment of FIG. 1, the polling logic 208 may be stored in the memory 203. The polling logic 208 may be any hardware, microcode, firmware, software, programmable logic, or other logic that e.g., monitors, detects, and verifies various components of the controllers, and dictates a response of the processing circuit 202. The polling logic 208 may function to verify the status of the controller where the polling logic 208 resides, e.g., the primary controller 200, or neighboring controllers to assure that the primary controller 208 and its neighbors are fully operational.

The functions of the logics, e.g., polling logic 208, may be performed regardless of the state, e.g., active or idle, of the controllers comprising the logic. For example, the SR controller 400 may be designed to remain idle except upon the occurrence of a fault/failure of both the primary 200 and secondary 300 controllers. Although the SR controller 400 remains idle, the logics contained thereon may continuously perform its functions, e.g., monitoring, on the remaining controllers. Additionally, the polling logic 208 may include analog or digital comparators for comparing, bit for bit, one or more signals transmitted between circuits within the controller, or signals between controllers. The comparators of the polling logic 208 may function to monitor, compare, and verify that the data received by each controller of the NVR 100, e.g., the second controller 300 and SR controller 400, is adequately represented across each controller, such that each controller, in its own right, may assume control from the faulty controller. Adequately represented means that the data transmitted to each controller is sufficient to maintain system operability during a fault occurrence. In instances where the data may not be adequately represented, the polling logic 208 may further function to request that the data be transmitted again from the input module 110 to the controllers, or may cause, e.g., the primary controller 200 to synchronize its data to the remaining controllers such that the data across the controllers of the NVR 100 is adequately represented. It should be appreciated that not having the data adequately represented across the controllers may not be indicative of a fault occurrence in the controllers. However, should data be restricted, i.e., not writeable to the one or more controllers after an attempt to rewrite or sync the data, the polling logic 208 may be operable to treat such restrictions as a fault occurrence.

The polling logic 208 may include an internal timer to assist in performing its functions, e.g., status checks, randomly, or at predetermined time intervals (e.g., cyclically) depending on the requirements for the NVR 100. The internal timer may be set for minimum and maximum time intervals for performing the required functions. In one embodiment, the polling logic 208 may perform its data comparison function following the transmittal of data from the input module 110 to the input circuits of the controllers of the NVR 100. In a further embodiment, in addition to verifying or comparing data across multiple controllers, the polling logic 208 may function to verify that the circuits of the primary controller 200 or other controllers are operational, by causing the processing circuit 202 to transmit commands and/or requests for status to the other circuits for verifying the circuits' status. Alternatively, the polling logic 208 may function to verify signals transmitted from the one or more circuits of the controllers indicative of the status of the circuits without an initial request from the processing circuit 202. The circuits may submit these signals at random or at a predetermined time interval.

With continued reference to the figures, each controller may further include a means for generating an event, i.e., a signal/alarm generator 212 operably connected to the circuits of the controllers in the NVR 100. In an exemplary embodiment, the generator 212 may be a microcontroller comprising executable instructions stored in at least one of the memories 203 and processed by at least one the processing circuits 202 to generate and relay to the controllers in the NVR 100 one or more signals or values representative of the operability of the circuits, e.g., system fully function value, or upon the occurrence of an event error, e.g., a fault value.

The values produced by the generator 212 may be transmitted to the processing circuit 202 or polling logic 208 in response to the verification requests or to confirm the status of the circuits or controllers. The generated values may include any dataset indicative of the operability of the circuit/controller, or the occurrence of a fault. For example, the value 1 may be generated and representative of circuitry that is fully function, while the value 0 may be generated and representative that a fault (software or hardware related error) has occurred. In instances where one or more circuits return a value that is indicative of a fault occurrence, the polling logic 208 may cause the processing circuit to initiate a means for reassigning one or more controllers if a fault occurs, i.e., the fault logic 210 for handling the occurrence of a fault in the controllers of the NVR 100, e.g., the primary controller 200.

The fault logic 210 may be stored in the memory 203, or may be its own independent circuitry within the controller and operably connected to the processing circuit 202 and memory 203. The fault logic 210 may include a similar configuration to the polling logic 208, in that it may be any hardware, firmware, and programmable logic etc., configured to dictate a response from the processing circuit 202 in the event of a fault. The fault logic 210 may primarily function to indicate to the processing circuit 202 the detection of a fault, and for example, initiates the processes for activating and deactivating one or more controllers.

In one embodiment, the fault logic may comprise or employ a switching logic 214, which may be configured to change the state of one or more controller in the NVR 100, e.g., from an active state to an idle state or vice versa, or to a shutdown state to shutdown the controller for removal or repair. It should be appreciated that only one controller may be active, i.e., in control, in the NVR 100. The remaining controllers may be in an idle state, i.e, operable within the NVR 100 and awaiting the detection of fault in the active controller to assume control from the active controller. The switching logic 214 may be its own logic, or part of any other logic, e.g., fault logic 210, residing in the memory 203. The switching logic 214 may have a similar configuration to the polling logic 208 and fault logic 210. The switching logic 214 may further be operably configured to facilitate or begin the shut down process for the faulty controller following its status change.

In an exemplary embodiment, upon the occurrence of a fault, the fault logic 210 may be operable to identify which circuit/controller has returned the value indicative of a fault during the polling process. Thereafter, the fault logic 210 may cause the processing circuit 202 to initiate the switching logic 214. For example, if the fault has been detected in the primary controller 200 during the polling process, the fault logic 210 indicates the occurrence of a fault to the remaining controllers, and initiates the switching logic 214 to operably switch control from the primary controller 200 to the secondary controller 300, thereby allowing the secondary controller 300 to assume the responsibilities/functionalities of the primary controller 200. During this process, the secondary controller 300 may now become the active controller, i.e., state changed to active so that the secondary controller 300 is in control, while the primary controller's 200 state may be changed from active to idle, or active to a shutdown state for beginning the removal and/or repair of the primary controller 200. In an exemplary embodiment, the state of the controller may be dictated by the status of the output circuit of the controllers of the NVR 100. For example, the switching logic 214 may then change the state of the controller by activating the output circuit 206 of the active controller, and disabling the output circuit 206 of the faulty controller, e.g., the primary controller 200, thereby permitting the output circuit 206 to transmit data to the output module 130. In should be appreciated that only one controller may be operable in the active state during standard operation, while the remaining controllers may be in the idle state such that the remaining controllers will not interfere with the output of the active controller.

In a further embodiment, following the reassignment of secondary controller 300 as the active controller, any one of the logics, e.g., the fault logic 210 or switching logic 212, may cause the processing circuit 202 to initiate a validating logic 216 to confirm that the secondary controller 300 has successfully taken over the responsibilities of the primary controller 200. This validating process may be initiated and performed by any of the circuits or logics in the remaining controllers. Following the successful validation, the switching logic 214 may begin the shutdown process of the primary controller 200. Upon switching the state of the secondary controller 300 from idle to active, the SR controller 400 may continue to remain in an idle state, and operably check/poll the secondary controller 300 via the SR controller polling logic 208. It should further be appreciated that the programmable logics described herein may be fully operable to perform its functions in the active or idle state. For example, the polling function may be performed by a polling logic 208 of the secondary controller 300 while in the idle state. Additionally, the functions of the logics described herein may continue to be carried out by its respective logics during any of the other processes described herein such that the NVR 100 provides real time redundancy. As previously stated, and in an exemplary embodiment, the primary controller 200 and secondary controller 300 may communicate within the NVR 100 over bus 120. The SR controller 400 may be operably connected to the primary controller 200 and secondary controller 300 via, e.g., the Global Area Network, to perform its function of assuming control in the event of dual contingency, i.e., a fault occurrence in both the primary 200 and secondary controllers 300.

In yet a further exemplary embodiment, where the primary controller 200 has been removed for maintenance or replacement due to the fault occurrence, the remaining polling logics 208 may continue to operably poll the remaining circuits/controllers to compare data and verify that the remaining controllers are operational. In an instance where the polling logics 208 identifies a fault in the second controller 300, the fault logic 210 may be initiated as described above, which may begin the process via the switching logic 214 for designating the SR controller 400 as the active controller, and switching the faulty secondary controller 300 to a shutdown state for subsequent removal and/or repair.

In yet another exemplary embodiment, and prior to activating the output circuit of the SR controller 400, i.e., switching the SR controller 400 to an active state, the switching logic 214 or polling logic 208, may cause the processing circuit 202 of the SR controller 400 to transmit a series of commands/requests to identify that the SR controller 400 is the sole remaining controller operable in the NVR 100. In this embodiment, and upon confirmation that no additional controllers are operable in the NVR 100, the switching logic 214 may then switch the SR controller 400 to the active state, thereby activating its output circuit 206 to facilitate the transmission of output data to the output module 130.

It should also be appreciated, that the switching logic 214 may further be operable to return functionality from the SR controller 400 once the polling logic 208 verifies that another controller is available in NVR 100. For example, when the SR controller 400 is the active controller, the polling logic 208 continues to monitor whether or not any additional controllers, e.g., the primary 200, secondary controller 300, or a fourth controller, become available in the NVR 100. Upon the detection of the presence of another controller, the switching logic 214 is operable to return the SR controller 400 to an idle state, and return or hand off functionality to the other controller now available in the NVR 100. It should also be appreciated, in a further embodiment, that the above disclosed logics may only be present in only one of the controllers, e.g., the SR controller 400. In this embodiment, the logics of the SR controller 400 may perform the above functions, e.g., monitor, detect, switch, as it relates to the other controllers in the NVR 100, such that the decisions to shut down the other controllers may rely in the logic of the SR controller 400.

Figure 2:
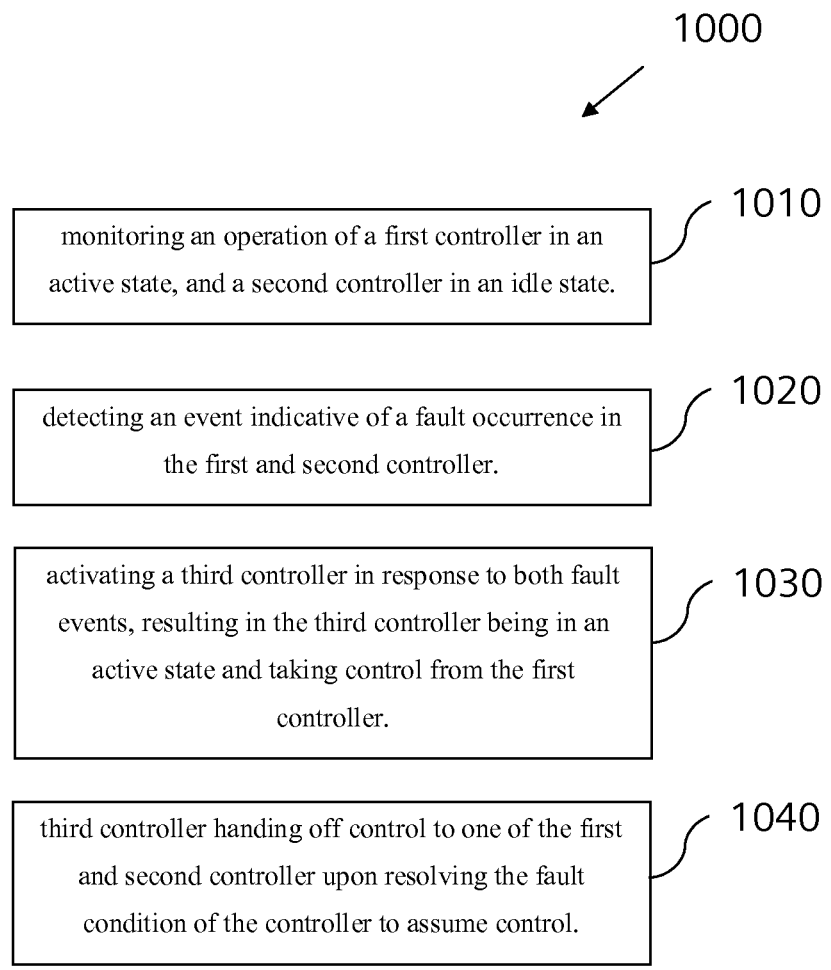
FIG. 2 illustrates a flowchart for an embodiment of a method for resolving fault detections in accordance with the disclosure provided herein.
Figure 3:
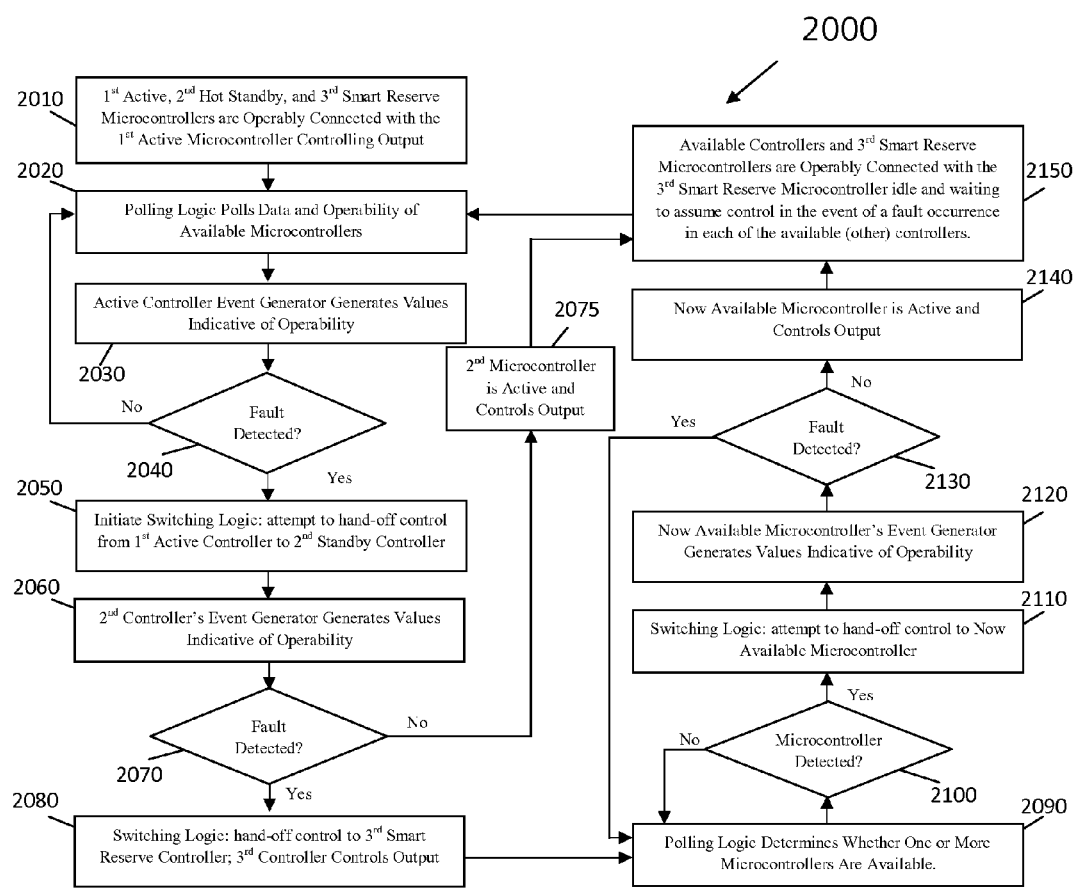
FIG. 3 illustrates a second flowchart for an embodiment of a method for resolving fault detections in accordance with the disclosure provided herein.

With reference to FIGS. 2 and 3, a method 1000 and operation 2000 for resolving fault detection in a control system is provided. The method 1000 and operation 2000 illustrated therein may be performed in a different order, with illustrated steps omitted, with additional steps added, or with a combination of reordered, combined, omitted, or additional steps.

In step 1010, monitoring an operation of the primary controller 200 in an active state, and a secondary controller 300 in an idle state. In this step, the polling logic 208 may monitor the operability of the controllers in the NVR 100 to assure that any data necessary for maintaining system functionality is present in the controllers of the NVR 100, and that the circuitry of the controllers is operational. It should be appreciated that the controller in the active state, e.g., the primary controller 200 is the controller that is in control of output. The remaining idle controllers are available in the NVR 100, i.e., online and operable, may continue to execute its logics for performing various functions to maintain system functionality and provide redundancy in the event of a failure. In step 1020, detecting an event indicative of a fault occurrence in the primary controller 200 and second controller 300. In this step, the signal/alarm/event generator 212 may generate one or more signals indicating whether or not a fault event has occurred in the controllers. It should be appreciated that the generators 212 may generate an event indicative of a fault occurrence in the controllers in response to a status request from the polling logic 208, or independent of a status request, e.g., at a predetermined time interval or randomly, based on the generator's 212 configuration.

In step 1030, activating the SR controller 400 in response to the fault events of the primary controller 200 and the secondary controller 300, resulting in the SR controller 400 being switched to an active state, and thereby taking control e.g., output control, from the primary controller 200. In this step, the switching logic 214 may be initiated upon the detection and confirmation of a fault occurrence in both the primary controller 200 and the secondary controller 300, and subsequently reassign control to the SR controller 400. Upon switching the SR controller 400 to active status, the switching logic 214 may switch the fault controllers in the NVR 100 to a shutdown state for removal and/or repair of the faulty controllers. In step 1040, the SR controller 400 may relinquish its control by initiating the switching logic 214, which may facilitate handing off control to one of the primary controller 200 and the secondary controller 300 upon resolving the fault condition in either controller. In this step, the NVR 100 may be continuously monitored by the polling logic 208 of the SR controller 400 to monitor functionality, and also to determine the presence of another operable controller in the NVR 100. Once it is determined that another operable controller is available, the switching logic may switch control to the now available controller by switch its state to active, which allows the now available controller to assume control from the SR controller 400.

With continued reference to FIG. 3, the operation 2000 may include in 2010 the primary microcontroller 200, the secondary microcontroller 300, and the SR microcontroller 400 operably connected to one another with the primary microcontroller 200 in control of output.

In operation 2020, the polling logic 208 may poll the data and operability of the available microcontrollers, e.g., the primary controller 200, the secondary controller 300 and SR controller 400. The polling logic 208 may reside in each controller, resulting in three polling logics 208 operably monitoring the operability of the controller in which the logic resides, and/or polling all the available controllers operably connected in the NVR 100.

In operation 2030, the primary controller's, event generator 212 generates values indicative of the controller's operability. In a fault event is not generated by the event generator 212 in operation 2040, the primary controller 200 remains active, i.e., in control, and operation 2020 may be repeated to continuously monitor functionality.

If a fault 2040 is detected, then in operation 2050, the switching logic 214 may be initiated to attempt a hand-off of control from the primary controller 200 to the secondary controller 300. The switching logic 214 attempts the handoff by switching the secondary controller 300 to an active state. It should be appreciated that during this operation, the polling logic 208 may continue to monitor the operability of the secondary controller 300.

In operation 2060, the secondary controller's 200 event generator 212 generates values indicative of operability. If a fault event is not generated in operation 2070, then in operation 2075, the secondary controller 300 is active and controls output. If a fault event is generated and communicated in operation 2070, then in operation 2080, the switching logic 214 switches control to the SR controller 400 by activating the SR controller 400, resulting in the SR controller 400 controlling output. During this operation, the switching logic 214 may also switch the state of the faulty controllers to a shutdown state to begin the removal and/or repairing process of the faulty controllers.

In operation 2090, the polling logic 208 may determine whether one or more microcontrollers are available in the NVR 100. In this operation, because only the SR controller 400 may be available in the NVR 100, the polling logic 208 may reside on the SR controller 400, or a remote server (not shown) operably connected to the NVR 100 for performing the function of the logics, e.g., the polling logic 208. In operation 2100, if no additional microcontrollers are detected, then operation 2090 may be continuously repeated i.e., executed, until one or more additional microcontrollers are detected i.e., available in the NVR 100. If a microcontroller is detected, then in operation 2110, the switching logic 214 may attempt to relinquish control from the SR controller 400 to the now available microcontroller, e.g., a repaired or replaced primary 200, secondary 300, or a fourth operable controller (not shown) having a similar configuration to any of the primary 200, secondary 300, or SR controller 400.

In operation 2120, the now available microcontroller's event generator may generate values indicative of its operability. If a fault is detected in operation 2130, the SR controller 400 remains in control, i.e., the active controller, and operation 2090 may be repeated until one or more additional microcontrollers are detected and operable to assume control from the SR controller 400. If no fault event is generated and/or detected in operation 2130, then in operation 2140, the now available microcontroller is active and controls output, and in operation 2150, the now available controller(s) and SR controller 400 are operably connected to one another, and the SR controller 400 may be set to an idle state for waiting to assume control in the event of a fault occurrence in each of the available (other) controllers.

While specific embodiments have been described in detail, those with ordinary skill in the art will appreciate that various modifications and alternative to those details could be developed in light of the overall teachings of the disclosure. For example, elements described in association with different embodiments may be combined. Accordingly, the particular arrangements disclosed are meant to be illustrative only and should not be construed as limiting the scope of the claims or disclosure, which are to be given the full breadth of the appended claims, and any and all equivalents thereof. It should be noted that the terms "comprising", "including", and "having", are open-ended and does not exclude other elements or steps; and the use of articles "a" or "an" does not exclude a plurality.

We claim:

1. A non-voting redundant control system comprising:
an I/O module operably connected to a first, second, and third microcontroller for transmitting data, wherein the first microcontroller is in an active state, and the second and third microcontroller is in an idle state;
wherein the first and second microcontrollers includes: an event generator for generating an event indicative of a fault occurrence, wherein one of the first, second, and third microcontrollers includes: a means for detecting an event operably connected to the event generator detecting an a fault event from the event generator, and communicating the fault event to a means for reassigning a controller, wherein the third microcontroller includes: the means for reassigning a controller operably connected to one of the event generators and the means for detecting an event, the means for reassigning a controller being operable to change the state of each microcontroller; and
wherein upon detection of the fault event in both the first and second microcontrollers, the means for reassigning a controller switches the state of the first microcontroller with the third microcontroller, resulting in the third microcontroller being the active microcontroller.

2. The system of claim 1, wherein the means for detecting an event in on the third microcontroller.

3. The system of claim 1, wherein prior to switching the state of the first microcontroller with the third microcontroller, the means for reassigning a controller attempts to the second microcontroller to an active state.

4. The system of claim 3, wherein the attempt to switch the second controller fails and generates the fault event in the second microcontroller.

5. The system of claim 1, wherein each of the microcontrollers includes: an output circuit operably coupled to an I/O module.

6. The system of claim 5, wherein the means for reassigning a controller switches the state of the first microcontroller with the third microcontroller by activating the output circuit of the third microcontroller and deactivating the output circuit of the first microcontroller.

7. A method for resolving fault detection in a control system comprising the steps of:
monitoring, via a means for detecting an event indicative of a fault occurrence, an operation of a first controller in an active state, and a second controller in a idle state;
detecting an event indicative of a fault occurrence in the first controller, and detecting an event indicative of a fault occurrence in the second controller;

activating, via a means for reassigning a controller, a third controller in response to both events, resulting in the third controller being in an active state.

8. The method of claim 7, wherein the event is generated by an event generator operably connected to the means for detecting an event indicative of a fault occurrence.

9. The method of claim 7 further comprising:
prior to detecting the event indicative of a fault occurrence in the second controller, attempting to set the second controller to an active state.

10. The method of claim 7, wherein the means for detecting an event indicative of a fault occurrence is in one of the second and third controller.

11. The method of claim 7 further comprising the step of:
returning the third controller, via the means for reassigning a controller, to an idle state upon the availability of one or more controllers selected from the group consisting of the first controller, the second controller, and a fourth controller, in the control system.

12. The method of claim 7 further comprising the step of:
the third controller handing off control to one of the first controller or the second controller upon resolving the fault condition of either the first controller or the second controller.

13. The method of claim 11 further comprising the step of:
returning the third controller to an idle state.

14. The method of claim 12 further comprising the step of:
returning the third controller to an idle state.

15. A non-transitory computer-readable medium storing therein programming logic that causes a third controller in an idle state to execute an operation, the operation comprising:
monitoring, via a means for detecting an event indicative of a fault occurrence, an operation of a first controller in an active state and a second controller in a idle state;
detecting an event indicative of a fault occurrence in the first controller, and
detecting an event indicative of a fault occurrence in the second controller;
activating, via a means for reassigning a controller, the third controller in response to both events by switching the third controller to an active state.

16. The non-transitory computer-readable medium of claim 15, the operation further comprises:
prior to detecting the event indicative of a fault occurrence in the second controller, attempting to switch the second controller to an active state.

17. The non-transitory computer-readable medium of claim 15, the operation further comprises:
returning the third controller to an idle state upon resolving the event indicative of a fault occurrence of one of the first controller or the second controller.

18. The non-transitory computer-readable medium of claim 17, wherein the step of returning the third controller to an idle state renders active one of the first controller or the second controller.

19. The non-transitory computer-readable medium of claim 17, the operation further comprises:
returning the third controller to an idle state upon the availability of one or more controllers selected from the group consisting of the first controller, the second controller, and a fourth controller.

20. The non-transitory computer-readable medium of claim 15, wherein the events indicative of a fault occurrence is generated by an event generator.

21. The system of claim 1, wherein the first, second and third microcontrollers are similarly configured to operate in the active state.

* * * * *